United States Patent
Han et al.

(10) Patent No.: US 7,294,949 B2
(45) Date of Patent: Nov. 13, 2007

(54) SINGLE-PHASE INDUCTION MOTOR

(75) Inventors: Seung-Do Han, Incheon (KR);
Hyoun-Jeong Shin, Incheon (KR);
Jae-Hong Ahn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 11/252,558

(22) Filed: Oct. 19, 2005

(65) Prior Publication Data

US 2006/0087190 A1    Apr. 27, 2006

(30) Foreign Application Priority Data

Oct. 23, 2004    (KR)    .................... 10-2004-0085123

(51) Int. Cl.
*H02K 7/10* (2006.01)
*H02K 7/11* (2006.01)
*H02K 16/00* (2006.01)
*H02K 17/18* (2006.01)
*H02K 17/28* (2006.01)

(52) U.S. Cl. .................. 310/166; 310/112; 310/114; 310/211; 310/212; 310/216

(58) Field of Classification Search ............ 310/166, 310/112, 114, 211, 212, 216, 261
See application file for complete search history.

(56) References Cited

U.S. PATENT DOCUMENTS

| 3,683,249 | A | * | 8/1972 | Shibata et al. ............. 318/730 |
| 4,137,473 | A | * | 1/1979 | Pfister ........................ 310/98 |
| 4,745,318 | A | * | 5/1988 | Ivanics ...................... 310/114 |
| 5,723,928 | A | * | 3/1998 | Imai et al. ................. 310/114 |
| 5,917,248 | A | * | 6/1999 | Seguchi et al. ............. 290/31 |
| 6,380,655 | B1 | * | 4/2002 | Ide et al. .................... 310/211 |
| 6,703,740 | B2 | * | 3/2004 | Klode ........................ 310/114 |
| 2002/0116941 | A1 | | 8/2002 | Kim et al. |
| 2006/0131984 | A1 | * | 6/2006 | Han et al. .................. 310/261 |
| 2006/0175924 | A1 | * | 8/2006 | Han et al. .................. 310/166 |
| 2006/0208597 | A1 | * | 9/2006 | Lee et al. ................... 310/211 |
| 2006/0226722 | A1 | * | 10/2006 | Kim et al. .................. 310/114 |

FOREIGN PATENT DOCUMENTS

| DE | 1 810 736 A1 | 7/1970 |
| EP | 1 416 616 A1 | 5/2004 |
| EP | 1 455 435 A2 | 9/2004 |
| GB | 2 141 290 A | 12/1984 |
| JP | 05015127 A * | 1/1993 |

\* cited by examiner

*Primary Examiner*—Tran Nguyen
(74) *Attorney, Agent, or Firm*—Birch, Stewart, Kolasch & Birch, LLP (57) ABSTRACT

A single-phase induction motor comprises a stator having a stator coil; an induction cage rotor rotatably inserted into a receiving groove of the stator, having a rotation shaft at a center thereof, having a plurality of first conductor bars at an outer peripheral portion thereof with the same interval in a circumferential direction, having a protrusion portion at an outer circumferential surface thereof, and having a plurality of second conductor bars installed at the protrusion portion in a circumferential direction; and a permanent magnet rotor free-rotatably installed between the stator and the induction cage rotor.

20 Claims, 6 Drawing Sheets

SINGLE-PHASE INDUCTION MOTOR

BACKGROUND OF THE INVENTION

1. Field of the Invention

The present invention relates to a single-phase induction motor, and more particularly, to a single-phase induction motor capable of decreasing a driving torque thereof and varying a rotation speed of an induction cage rotor.

2. Description of the Conventional Art

Generally, a motor is a device for converting an electric energy into a mechanical energy, and is divided into a DC motor and an AC motor according to a used power. The DC motor includes an induction motor, a synchronous motor, a commutator motor, etc.

The induction motor has a structure that a permanent magnet rotor is free-rotatably installed at an air gap between a stator and an induction cage rotor. When the permanent magnet rotor is rotated with a synchronous speed by a rotation magnetic field of the stator, the induction cage rotor is rotated by a strong magnetic flux generated from the permanent magnet rotor.

Figure 1:
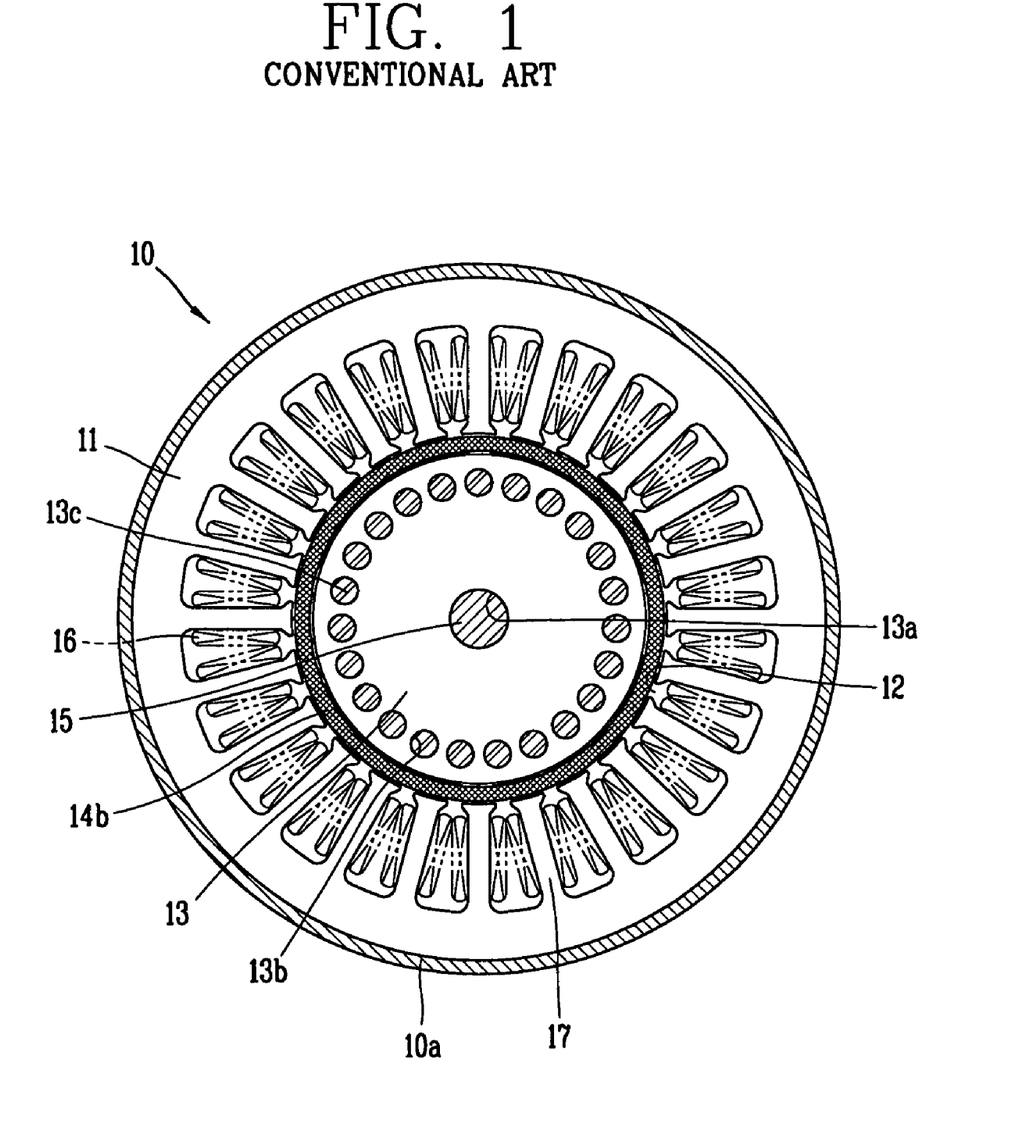
FIG. 1 is a frontal view showing a single-phase induction motor in accordance with the conventional art.
Figure 2:
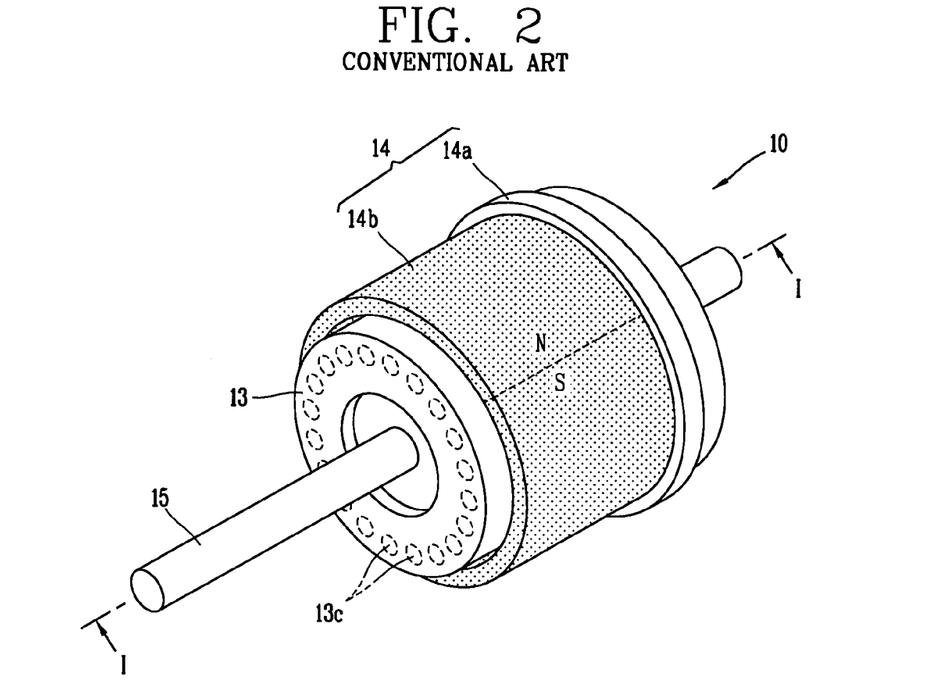
FIG. 2 is a perspective view showing a permanent magnet rotor and an induction cage rotor in the single-phase induction motor in accordance with the conventional art.
Figure 3:
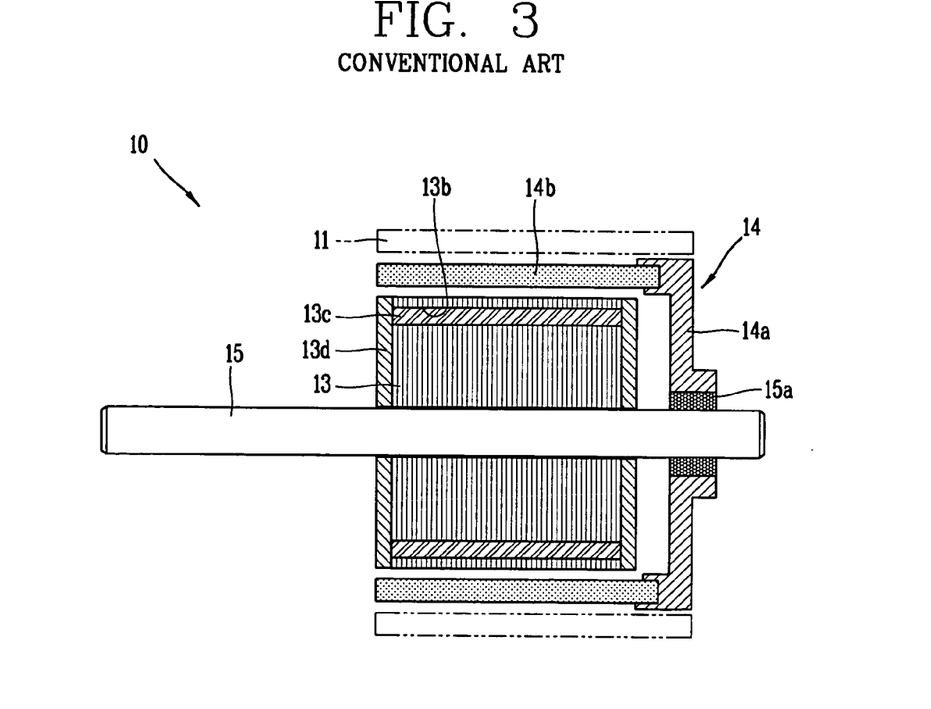
FIG. 3 is a section view taken along line I-I in FIG. 2.

FIG. 1 is a frontal view showing a single-phase induction motor in accordance with the conventional art, FIG. 2 is a perspective view showing a permanent magnet rotor and an induction cage rotor in the single-phase induction motor in accordance with the conventional art, and FIG. 3 is a longitudinal section view showing the permanent magnet rotor and the induction cage rotor in the single-phase induction motor in accordance with the conventional art.

As shown, the conventional single-phase induction motor 10 comprises a stator 11 fixed to inside of a casing (not shown), an induction cage rotor 13 rotatably installed in a receiving groove 12 of the stator 11, a permanent magnet rotor 14 free-rotatably installed between the stator 11 and the induction cage rotor 13, and a shaft 15 fixed to the center of the induction cage rotor 13.

A coil winding portion 17 on which a stator coil 16 is wound so that the stator 11 can have an N polarity or an S polarity is formed at one side of the stator 11.

The induction cage rotor 13 is provided with a shaft hole 13a for fixing the shaft 15 at the center thereof, and a plurality of conductor holes 13b are formed at the outer peripheral portion thereof in a circumferential direction with the same interval. Each conductor hole 13b is provided with a conductor bar 13c, and an end ring 13d is formed at an end of the conductor bar 13c.

The permanent magnet rotor 14 includes a frame 14a for rotatably coupling the shaft 15 to the center thereof, and a permanent magnet 14b coupled to the end of the frame 14a in a circumferential direction and freely-rotated by the rotation magnetic field of the stator 11 for rotating the induction cage rotor 13. The frame 14a is provided with a shaft bearing 15a at the center thereof.

An operation of the conventional single-phase induction motor will be explained as follows.

When power is supplied to the stator coil 16, the stator coil 16 generates a rotation magnetic field.

By the rotation magnetic field of the stator coil 16, the stator 11 generates a rotation magnetic field.

The rotation magnetic field of the stator 11 is transmitted to the permanent magnet rotor 14, and thereby the permanent magnet rotor 14 is freely rotated with a synchronous speed. The permanent magnet rotor 14 generates a rotation magnetic field having a strong flux and the induction cage rotor 13 is rotated by the generated rotation magnetic field.

However, the conventional single-phase induction motor has to be operated in a constant consumption power, thereby degrading a driving performance and not varying a speed of the induction cage rotor.

SUMMARY OF THE INVENTION

Therefore, an object of the present invention is to provide a single-phase induction motor capable of lowering a driving voltage necessary to drive a permanent magnet rotor, enhancing a driving function thereof, and varying a rotation speed of an induction cage rotor.

Another object of the present invention is to provide a single-phase induction motor capable of reducing a fabrication cost by reducing a size of a permanent magnet.

To achieve these and other advantages and in accordance with the purpose of the present invention, as embodied and broadly described herein, there is provided a single-phase induction motor, comprising: a stator fixedly installed in a casing; an induction cage rotor rotatably inserted into a receiving groove of the stator, having a rotation shaft at the center thereof, having a plurality of first conductor bars at an outer peripheral portion thereof in a circumferential direction with the same interval, having a protrusion portion at an outer circumferential surface thereof, and having a plurality of second conductor bars installed at the protrusion portion in a circumferential direction; and a permanent magnet rotor free-rotatably installed between the stator and the induction cage rotor.

The first conductor bars are inserted into first holes formed at the outer peripheral portion of the induction cage rotor in a circumferential direction, and the second conductor bars are inserted into second holes formed at the protrusion portion.

The protrusion portion is extending from the outer circumferential surface of the induction cage rotor in a radial direction, and a permanent magnet of the permanent magnet rotor is preferably positioned at a side corresponding to the protrusion portion.

The protrusion portion and the permanent magnet are preferably positioned on the same line in a shaft direction.

When it is assumed that a length of the second conductor bar is $D_L$ and a length of the permanent magnet is $M_L$ in the shaft direction, a formula of $D_L \leq M_L/2$ is preferably formed.

The first conductor bar and the second conductor bar are preferably fixed by end rings.

Preferably, a first air gap is formed between the stator and the permanent magnet, and a second air gap is formed between the permanent magnet and the induction cage rotor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
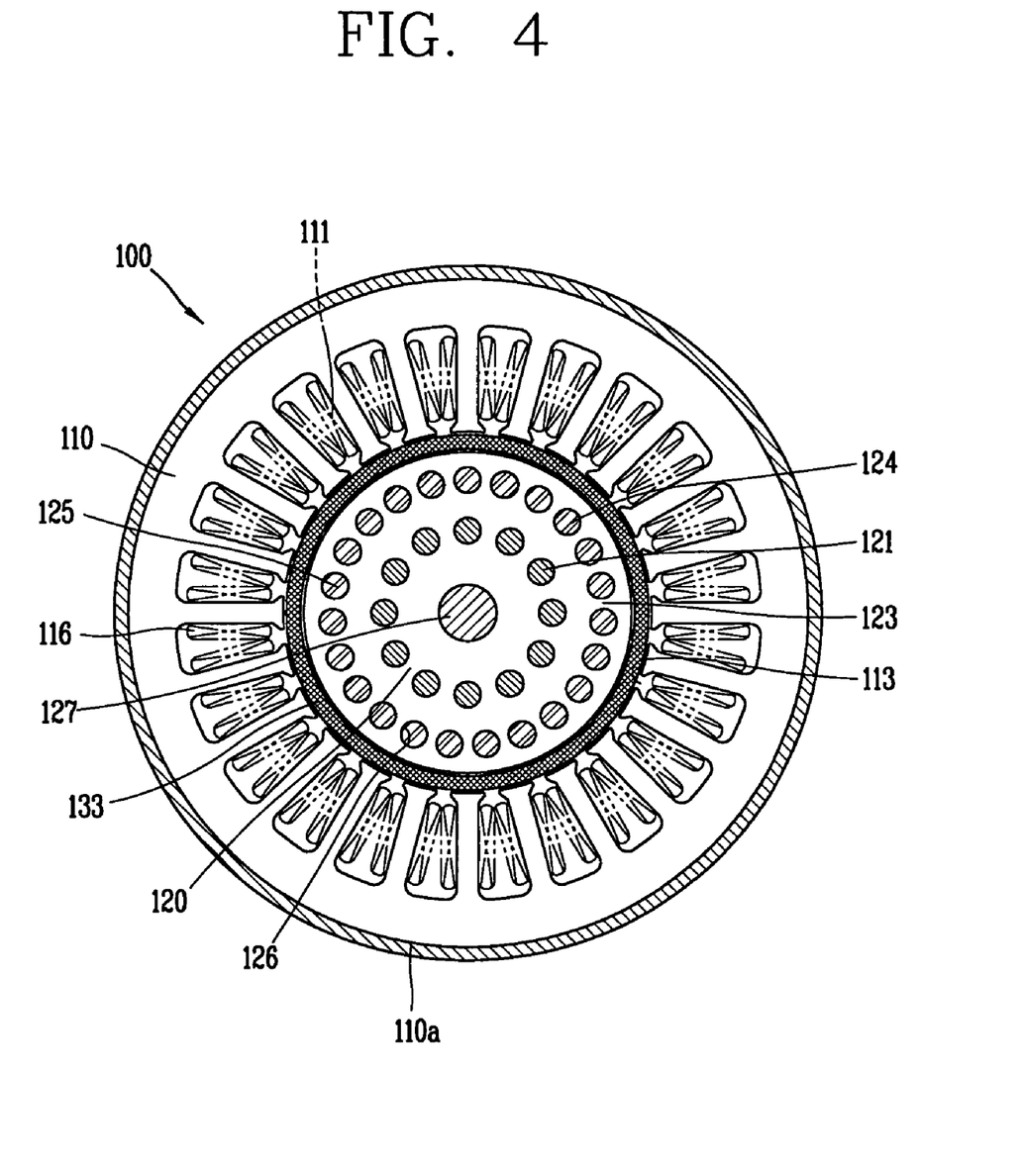
FIG. 4 is a frontal view showing a single-phase induction motor according to a first embodiment of the present invention.
Figure 5:
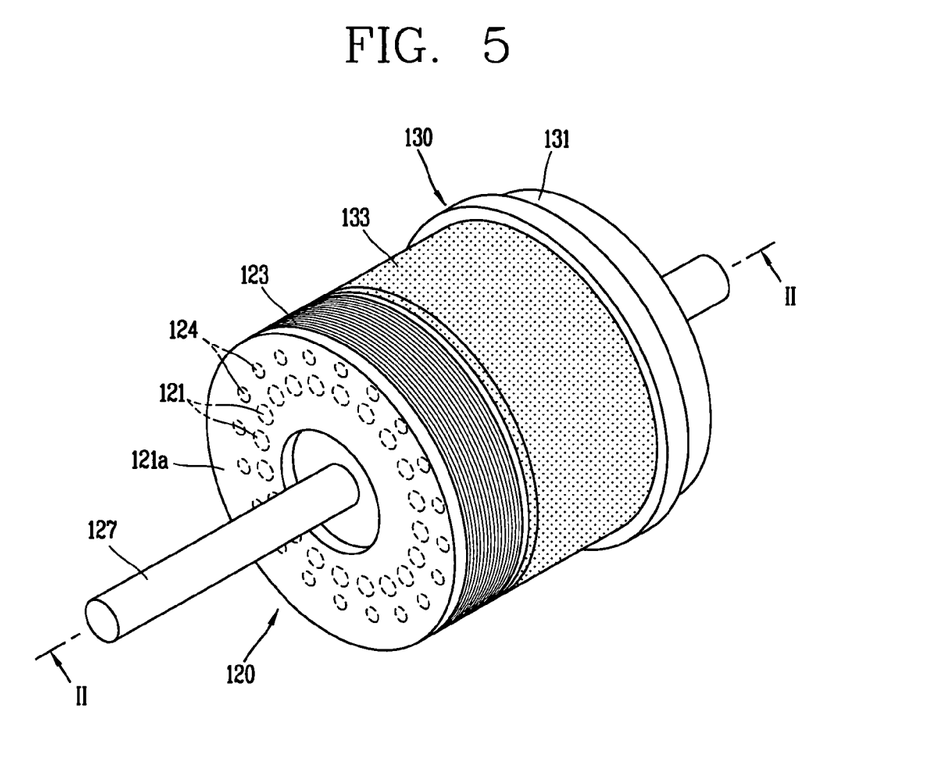
FIG. 5 is a perspective view showing the single-phase induction motor according to the first embodiment of the present invention.
Figure 6:
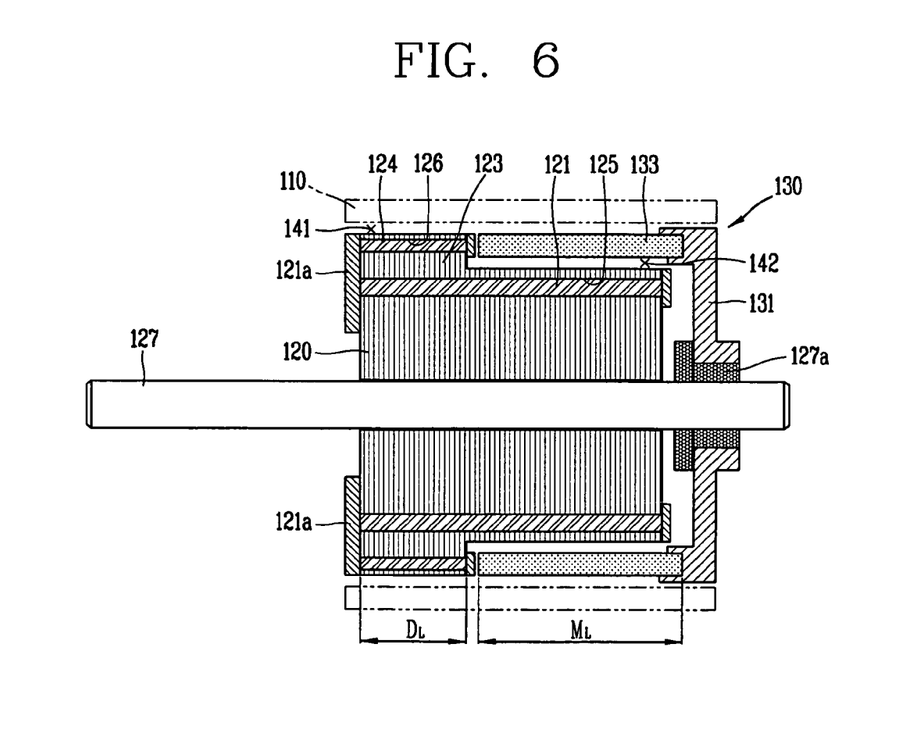
FIG. 6 is a sectional view taken along line II-II in FIG. 5.
Figure 7:
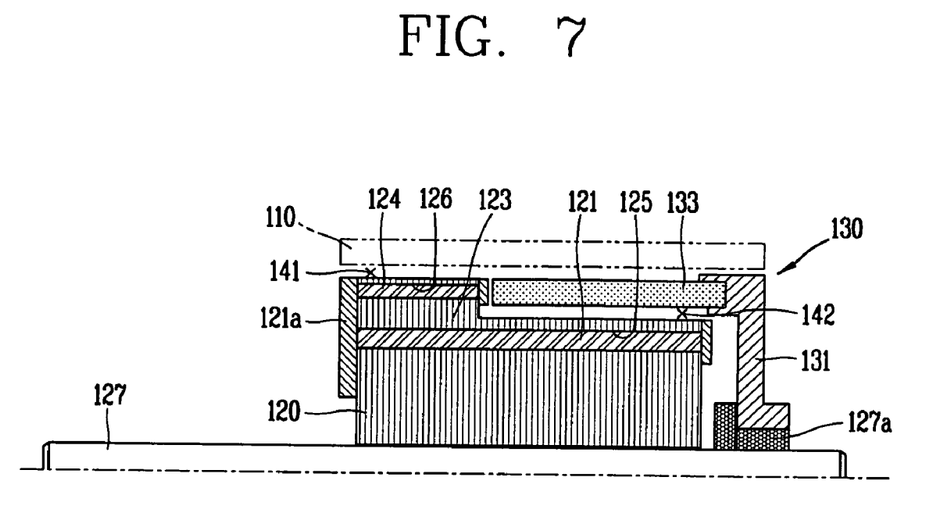
FIG. 7 is a longitudinal section view showing a state that a first conductor bar and a second conductor bar are positioned in parallel with a shaft in the single-phase induction motor according to the first embodiment of the present invention.

FIG. 4 is a frontal view showing a single-phase induction motor according to a first embodiment of the present invention, FIG. 5 is a perspective view showing the single-phase induction motor according to the first embodiment of the present invention, FIG. 6 is a sectional view taken along line II-II in FIG. 5, and FIG. 7 is a longitudinal section view showing a state that a first conductor bar and a second conductor bar are positioned in parallel with a shaft in the single-phase induction motor according to the first embodiment of the present invention.

As shown, the single-phase induction motor 100 according to one embodiment of the present invention comprises a stator 110 fixedly installed in a casing 110a; an induction cage rotor 120 rotatably inserted into a receiving groove 113 of the stator 110, having a rotation shaft 127 fixed at the center thereof, having a plurality of first conductor bars 121 installed at an outer peripheral portion with the same interval in a circumferential direction, having a protrusion portion 123 at an outer circumferential surface thereof, and having a plurality of second conductor bars 124 installed at the protrusion portion 123 in a circumferential direction; and a permanent magnet rotor 130 free-rotatably installed between the stator 110 and the induction cage rotor 120.

A coil winding portion 116 on which the stator coil 111 is wound so that the stator 110 can have an N polarity or an S polarity is formed at one side of the stator 110.

Each of the first conductor bar 121 is inserted into each first hole 125 formed at an outer peripheral portion of the induction cage rotor 130 in a circumferential direction, and each of the second conductor bar 124 is inserted into each second hole 126 formed at the protrusion portion 123. The first conductor bar 121 and the second conductor bar 124 are formed by a die casting, and are generally formed of aluminum. However, the first conductor bar 121 and the second conductor bar 124 may be formed of copper.

An end ring 121a formed of aluminum is formed at each end of the first conductor bar 121 and the second conductor bar 124.

The protrusion portion 123 is extendingly formed from the outer circumferential surface of the induction cage rotor 120 in a radial direction, and a permanent magnet 133 of the permanent magnet rotor 130 is positioned at a side corresponding to the protrusion portion 123.

The permanent magnet rotor 130 includes a frame 131 to the center thereof a shaft 121 is rotatably coupled, and a permanent magnet 133 having a cylinder shape and coupled to the end of the frame 131 in a circumferential direction thus to be freely rotated by a magnetic field of the stator 110 for rotating the induction cage rotor 120.

An outer circumferential surface of the protrusion portion 123 and an outer circumferential surface of the permanent magnet 133 are preferably positioned on the same line in a shaft direction. That is, since the permanent magnet 133 is installed at a position covering the induction cage rotor 120 partially not entirely, the outer circumferential surface of the protrusion portion 123 and the outer circumferential surface of the permanent magnet 133 are positioned on the same line without a step.

When it is assumed that a length of the second conductor bar 124 is $D_L$ and a length of the permanent magnet is $M_L$ in the shaft direction, a formula of $D_L \leq M_L/2$ is preferably formed.

A first air gap 141 is formed between the stator 110 and the permanent magnet 133, and a second air gap 142 is formed between the permanent magnet 133 and the induction cage rotor 120.

The frame 131 is provided with a shaft bearing 127a for smoothly rotating the rotation shaft 127 at the center thereof.

The position of the first conductor bar and the second conductor bar in the single-phase induction motor according to another embodiment of the present invention will be explained as follows with reference to FIGS. 8 to 10.

Figure 8:
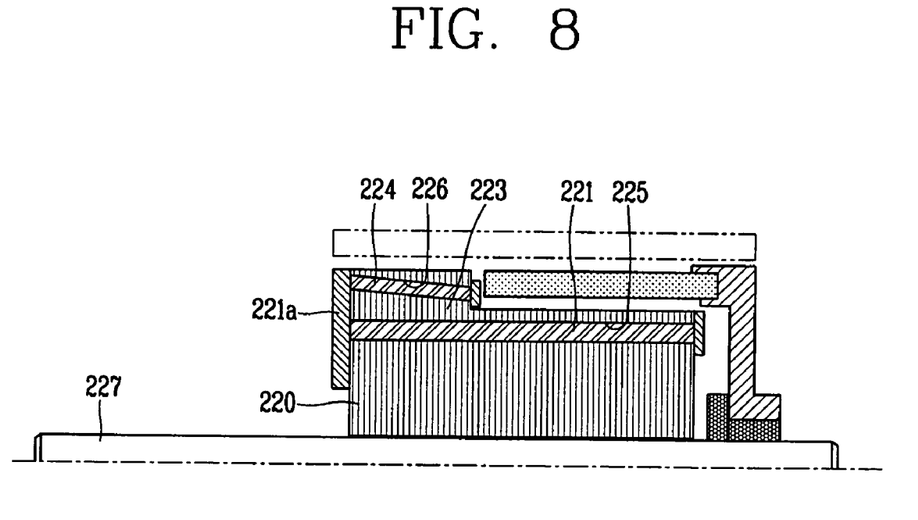
FIG. 8 is a longitudinal section view showing a state that the first conductor bar is positioned in parallel with the shaft and the second conductor bar is inclined based on the shaft in the single-phase induction motor according to another embodiment of the present invention.

FIG. 8 is a longitudinal section view showing a state that the first conductor bar is positioned in parallel with the shaft and the second conductor bar is inclined based on the shaft in the single-phase induction motor according to another embodiment of the present invention.

As shown in FIG. 8, a first conductor bar 221 is inserted into a first hole 225 formed at an outer peripheral portion of an induction cage rotor 220 in a circumferential direction, and a second conductor bar 224 is inserted into a second hole 226 formed at a protrusion portion 223. The first conductor bar 221 and the second conductor bar 224 are formed by a die casting. An end ring 221a is formed at each end of the first conductor bar 221 and the second conductor bar 224.

The first conductor bar 221 is positioned in parallel with a shaft 227 and the second conductor bar 224 is inclined based on the shaft 227.

Figure 9:
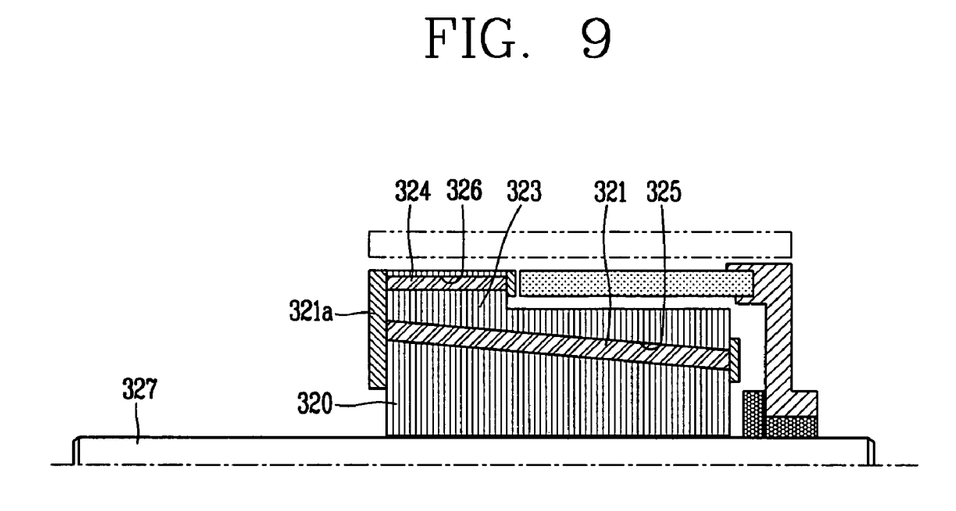
FIG. 9 is a longitudinal section view showing a state that the first conductor bar is inclined based on the shaft and the second conductor bar is positioned in parallel with the shaft in the single-phase induction motor according to still another embodiment of the present invention.

FIG. 9 is a longitudinal section view showing a state that the first conductor bar is inclined based on the shaft and the second conductor bar is positioned in parallel with the shaft in the single-phase induction motor according to still another embodiment of the present invention.

As shown in FIG. 9, a first conductor bar 321 is inserted into a first hole 325 formed at an outer peripheral portion of an induction cage rotor 320 in a circumferential direction, and a second conductor bar 324 is inserted into a second hole 326 formed at a protrusion portion 323.

The first conductor bar 321 and the second conductor bar 324 are formed by a die casting. An end ring 321a is formed at each end of the first conductor bar 321 and the second conductor bar 324, thereby fixing the first conductor bar 321 and the second conductor bar 324.

The first conductor bar 321 is inclined based on a shaft 327, and the second conductor bar 324 is positioned in parallel with the shaft 327.

Figure 10:
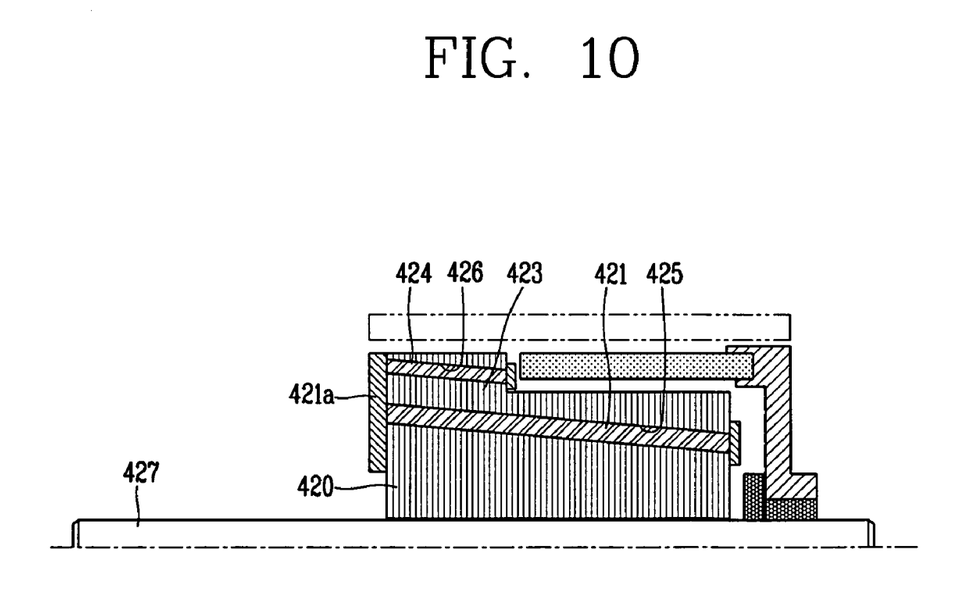
FIG. 10 is a longitudinal section view showing a state that the first conductor bar and the second conductor bar are inclined based on the shaft and in the single-phase induction motor according to yet still another embodiment of the present invention.

FIG. 10 is a longitudinal section view showing a state that the first conductor bar and the second conductor bar are inclined based on the shaft in the single-phase induction motor according to yet still another embodiment of the present invention.

As shown in FIG. 10, a first conductor bar 421 is inserted into a first hole 425 formed at an outer peripheral portion of an induction cage rotor 420 in a circumferential direction, and a second conductor bar 424 is inserted into a second hole 426 formed at a protrusion portion 423. The first conductor bar 421 and the second conductor bar 424 are formed by a die casting. An end ring 421a is formed at each end of the first conductor bar 421 and the second conductor bar 424.

The first conductor bar 421 and the second conductor bar 424 are inclined based on a shaft 427.

In the single-phase induction motors according to another embodiments of the present invention, when the first conductor bar and the second conductor bar are positioned in parallel with the shaft, a driving function and an efficiency of the induction motor are enhanced but noise is increased.

On the other hand, when the first conductor bar and the second conductor bar are positioned with an inclination from the shaft, the driving function and the efficiency of the induction motor are degraded even if noise is decreased.

Hereinafter, the operation of the single-phase induction motor according to one embodiment of the present invention will be explained with reference to FIGS. 4 to 7.

When a voltage is applied to the stator coil 111, the stator coil 111 generates a rotation magnetic field.

By the rotation magnetic field of the stator coil 111, the stator 110 generates a rotation magnetic field.

The rotation magnetic field of the stator 110 is transmitted to the permanent magnet rotor 130, and thereby the permanent magnet rotor 130 is freely rotated with a synchronous speed. As the permanent magnet 135 of the permanent magnet rotor 130 is freely rotated, a rotation magnetic field having a strong flux is generated. By the rotation magnetic field generated as the permanent magnet 135 of the permanent magnet rotor 130 is freely rotated, the induction cage rotor 120 is rotated and thus the induction motor can be driven with a low efficiency and a low noise.

The protrusion portion 123 is formed at the outer circumferential surface of the induction cage rotor 120 with a step and a plurality of the second conductor bars 124 are installed at the protrusion portion 123 with the same interval in the circumferential direction. That is, since the permanent magnet 133 is installed at a position to partially cover the induction cage rotor 120 not entirely, the outer circumferential surface of the protrusion portion 123 and the outer circumferential surface of the permanent magnet 133 are positioned on the same line without a step. Accordingly, the rotation force of the induction cage rotor 120 is directly induced by the rotation magnetic field generated from the stator 110 thereby to enhance the driving function of the induction cage rotor 120.

As aforementioned, since the permanent magnet is installed at a position to partially cover the induction cage rotor not entirely, the induction cage rotor is driven not only by the rotation magnetic field of the permanent magnet but also by the rotation magnetic field of the stator. Accordingly, a driving torque can be greatly reduced thereby to enhance the driving function of the rotor. Also, since the rotation speed of the induction cage rotor can be varied and the size of the permanent magnet can be reduced, the fabrication cost can be greatly reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A single-phase induction motor, comprising:
a stator fixedly installed in a casing;
an induction cage rotor rotatably inserted into a receiving groove of the stator, having a rotation shaft at a center thereof, having a plurality of first conductor bars at an outer peripheral portion thereof with the same interval in a circumferential direction, having a protrusion portion at an outer circumferential surface thereof, and having a plurality of second conductor bars installed at the protrusion portion in a circumferential direction; and
a permanent magnet rotor free-rotatably installed between the stator and the induction cage rotor.

2. The single-phase induction motor of claim 1, wherein the first conductor bars are inserted into first holes formed at the outer peripheral portion of the induction cage rotor in a circumferential direction, and the second conductor bars are inserted into second holes formed at the protrusion portion.

3. The single-phase induction motor of claim 2, wherein the protrusion portion is extending from the outer circumferential surface of the induction cage rotor in a radial direction, and a permanent magnet of the permanent magnet rotor is positioned at a side corresponding to the protrusion portion.

4. The single-phase induction motor of claim 3, wherein the protrusion portion and the permanent magnet have outer circumferential surfaces positioned on the same line in a shaft direction.

5. The single-phase induction motor of claim 4, wherein when it is assumed that a length of the second conductor bar is $D_L$ and a length of the permanent magnet is $M_L$ in the shaft direction, a formula of $D_L \leq (M_L/2)$ is formed.

6. The single-phase induction motor of claim 2, wherein the first conductor bar and the second conductor bar are fixed by end rings.

7. The single-phase induction motor of claim 6, wherein the end ring is formed of aluminum.

8. The single-phase induction motor of claim 2, wherein at least one of the first conductor bar and the second conductor bar is positioned to be parallel with the rotation shaft.

9. The single-phase induction motor of claim 2, wherein at least one of the first conductor bar and the second conductor bar is inclined based on the rotation shaft.

10. The single-phase induction motor of claim 2, wherein a first air gap is formed between the stator and the permanent magnet, and a second air gap is formed between the permanent magnet and the induction cage rotor.

11. A single-phase induction motor, comprising:
a stator;
an induction cage rotor rotatably inserted into a receiving groove of the stator, having a rotation shaft at a center thereof, having a plurality of first conductor bars at an outer peripheral portion thereof with the same interval in a circumferential direction, having a protrusion portion at an outer circumferential surface thereof, and having a plurality of second conductor bars installed at the protrusion portion in a circumferential direction; and
a permanent magnet rotor free-rotatably installed between the stator and the induction cage rotor.

12. The single-phase induction motor of claim 11, wherein the first conductor bars are inserted into first holes formed at the outer peripheral portion of the induction cage rotor in a circumferential direction, and the second conductor bars are inserted into second holes formed at the protrusion portion.

13. The single-phase induction motor of claim 11, wherein the protrusion portion is formed at the outer circumferential surface of the induction cage rotor with a step, and the permanent magnet is installed at a location corresponding to the protrusion portion.

14. The single-phase induction motor of claim 13, wherein the protrusion portion and the permanent magnet have outer circumferential surfaces positioned on the same line in a shaft direction.

15. The single-phase induction motor of claim 14, wherein when it is assumed that a length of the second conductor bar is $D_L$ and a length of the permanent magnet is $M_L$ in the shaft direction, a formula of $D_L \leqq (M_L/2)$ is formed.

16. The single-phase induction motor of claim 11, wherein the first conductor bar and the second conductor bar are fixed by end rings.

17. The single-phase induction motor of claim 16, wherein the end ring is formed of aluminum.

18. The single-phase induction motor of claim 11, wherein at least one of the first conductor bar and the second conductor bar is positioned to be parallel with the rotation shaft.

19. The single-phase induction motor of claim 11, wherein at least one of the first conductor bar and the second conductor bar is inclined based on the rotation shaft.

20. The single-phase induction motor of claim 13, wherein a first air gap is formed between the stator and the permanent magnet, and a second air gap is formed between the permanent magnet and the induction cage rotor.

* * * * *